(12) United States Patent
Cho et al.

(10) Patent No.: US 8,958,642 B2
(45) Date of Patent: Feb. 17, 2015

(54) METHOD AND DEVICE FOR IMAGE PROCESSING BY IMAGE DIVISION

(71) Applicant: Electronics and Telecommunications Research Institute, Daejeon (KR)

(72) Inventors: Seunghyun Cho, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 119 days.

(21) Appl. No.: 13/654,682

(22) Filed: Oct. 18, 2012

(65) Prior Publication Data

US 2013/0101216 A1     Apr. 25, 2013

(30) Foreign Application Priority Data

Oct. 19, 2011  (KR) .......................... 10-2011-0106781
Sep. 3, 2012   (KR) .......................... 10-2012-0097005

(51) Int. Cl.
*G06K 9/34* (2006.01)
*H04N 19/00* (2014.01)

(52) U.S. Cl.
CPC ....................................... *H04N 7/26* (2013.01)
USPC ........... 382/173; 382/232; 382/233; 382/171; 382/164

(58) Field of Classification Search
USPC .......................... 382/171, 164, 173, 232, 233
See application file for complete search history.

(56) References Cited

U.S. PATENT DOCUMENTS

| 6,058,141 | A  | * | 5/2000 | Barger et al. ................. 375/240 |
| 6,115,070 | A  | * | 9/2000 | Song et al. ............... 375/240.12 |
| 2005/0123207 | A1 | * | 6/2005 | Marpe et al. .................. 382/239 |
| 2012/0183056 | A1 | * | 7/2012 | He et al. ................... 375/240.12 |

FOREIGN PATENT DOCUMENTS

| KR | 10-2010-0052945 A | 5/2010 |
| KR | 10-2010-0071865 A | 6/2010 |
| KR | 10-2011-0106466 A | 9/2011 |

OTHER PUBLICATIONS

Thomas Wiegand et al., "Overview of the H.264/AVC Video Coding Standard", IEEE Transactions on Circuits and Systems for Video Technology, Jul. 2003, pp. 560-576, vol. 13, No. 7.

* cited by examiner

*Primary Examiner* — Ali Bayat
(74) *Attorney, Agent, or Firm* — Rabin & Berdo, P.C.

(57) ABSTRACT

Disclosed are a method and a device for processing an image by using image division capable of simultaneously minimizing deterioration of an image quality due to an error in a transmission line and further improving compression efficiency in performing compression and restoration of an image signal by using multiple processors. The method of processing an image by using image division according to an exemplary embodiment of the present disclosure includes dividing an image frame into multiple subblocks having a predetermined pixel size; constituting multiple macroblocks by sampling respective pixels positioned at an identical position within a predetermined number of subblocks; and constituting multiple slices by dividing the multiple macroblocks based on the positions of the sampled pixels within the subblock.

4 Claims, 7 Drawing Sheets

Slice Group 0    Slice Group 1

METHOD AND DEVICE FOR IMAGE PROCESSING BY IMAGE DIVISION

CROSS-REFERENCE TO RELATED APPLICATIONS

This application is based on and claims priority from Korean Patent Application No. 10-2011-0106781, filed on Oct. 19, 2011, and Korean Patent Application No. 10-2012-0097005, filed on Sep. 3, 2012, with the Korean Intellectual Property Office, the disclosure of which is incorporated herein in its entirety by reference.

TECHNICAL FIELD

The present disclosure relates to a method and a device for processing an image by using image division, and more particularly to, a technology for dividing an image frame in order to process a high resolution image in parallel by using a multi processor.

BACKGROUND

Screen resolution of a mobile device, such as a mobile phone, a PMP and a PDA, has been gradually improved, and mobile devices such as i-Phone and tablet PC can also recently provide high quality video services. A home TV with screen resolution of 1920×1080 or more, that is, a level of full-HD, has been generalized together with the release of a digital TV, and thus a frame rate has been increased. An ultra HDTV (UHDTV) having resolution of 4K or 8K (for example, 7680×4320) based on a horizontal direction of the screen has attracted attention as a next-generation TV.

Image compression technologies capable of improving efficiency of image compression together with improvement of resolution of a display device have been developed and used. An amount of calculation for compression and restoration of an image increases as an image size increases and a frame rate increases.

As a method for reducing power consumption while processing a large amount of calculation, a multicore processor in which multiple CPUs exist in one chip was developed and has been universally used for a PC, a notebook computer and the like, and has been rapidly applied to a smart phone and a tablet PC.

Figure 1:
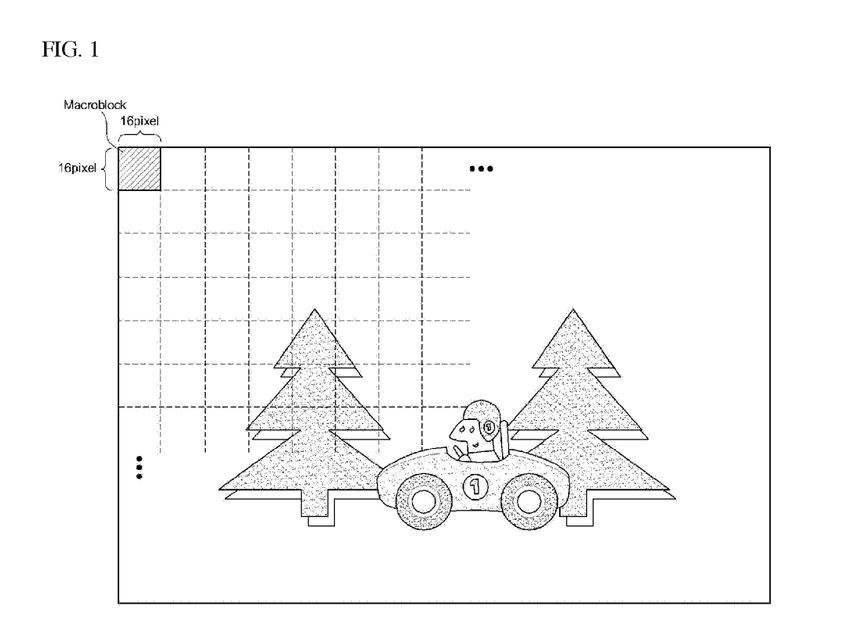
FIG. 1 is a diagram illustrating a method of dividing an image in the related art.

In a general image compression scheme in the related art, in order to effectively compress image data, an original image is divided into several blocks having a predetermined size to be processed, and one block includes adjacent pixels on the image. For example, in a case of the H.264/AVC standard, an image is divided and processed by a macroblock unit, and the macroblock includes one luminance sample block having a size of 16×16 and two chrominance sample blocks (a size of the chrominance sample block may vary according to a format of an input image). FIG. 1 is a diagram illustrating a method of dividing an image into macroblocks having a size of 16×16 according to the related art. As such, an entire image is divided into the macroblocks having a regular size, so that an encoding process or a decoding process is performed by the macroblock unit.

Figure 2A:
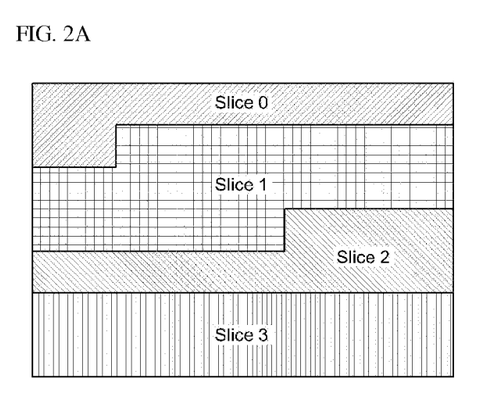
FIGS. 2A to 2D are diagrams illustrating various methods of dividing an original image into multiple slices.
Figure 2B:
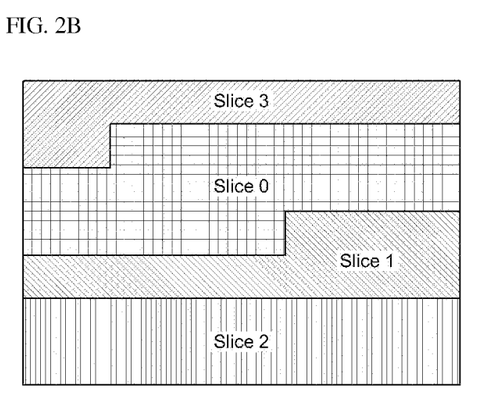
Figure 2C:
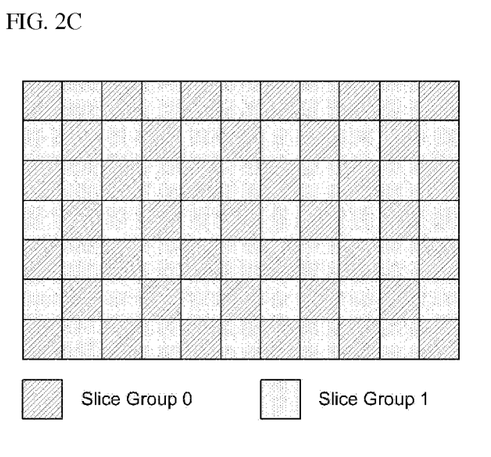
Figure 2D:
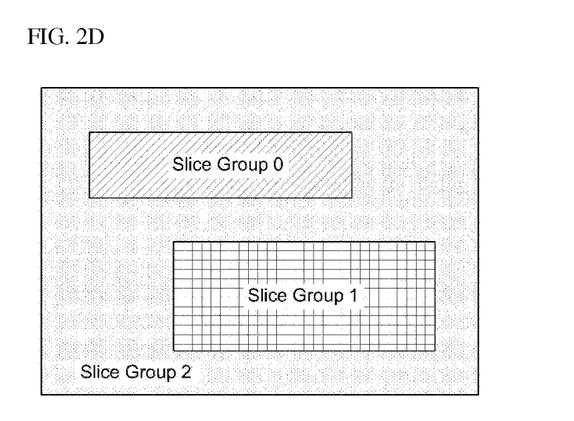

In order to prevent a decoded image from being deteriorated due to errors of a transmission line, the image compression standard in the related art uses a method of encoding an original image by dividing the original image into multiple slices, and thus an error generated in one slice is not propagated to another slice. For example, as illustrated in FIG. 2A, the MPEG-4 standard uses a method of constituting a slice by grouping multiple macroblocks in the order of a raster scan. In the H.264/AVC standard, a slice is constituted in various methods, such as a method of constituting a slice in an arbitrary order regardless of a scanning order as illustrated in FIG. 2B, a method of alternately allocating continuous macroblocks to different slice groups as illustrated in FIG. 2C, and a method of allocating macroblocks included in a predetermined quadrangular area to different slice groups as illustrated in FIG. 2D.

Figure 3:
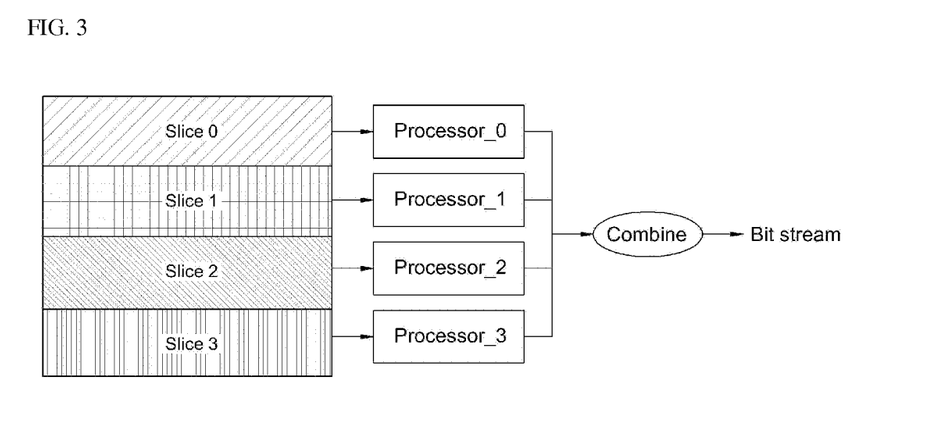
FIG. 3 is a diagram illustrating a method of encoding an image by using multiple processors.

In the meantime, the aforementioned method of dividing the image into the slices or the slice groups may be used for the purpose of dividing and performing an image encoding or decoding process through multiple processors, as well as for reducing an influence of errors in transmission and decoding of the image. FIG. 3 is a diagram illustrating a method of dividing one image into multiple slices, simultaneously encoding the divided slices by multiple image encoding processors, and then combining the encoded images into one bit stream.

However, in a case of using the method in the related art, it is impossible to use compression information on an adjacent slice, so that compression efficiency is deteriorated compared to a case of encoding an entire image into a single slice, and an image quality is unavoidably deteriorated in continuous predetermined areas of a decoded image when an error is generated in a transmission line. When the continuous macroblocks are allocated to the different slice groups in the method of FIG. 2C or in a similar manner thereto, the deterioration of the image quality due to the error may be dispersed to the entire image, but compression efficiency is further deteriorated.

SUMMARY

The present disclosure has been made in an effort to provide a method and a device for processing an image by using image division capable of simultaneously minimizing deterioration of an image quality due to an error in a transmission line and further improving compression efficiency in performing compression and restoration of an image signal by using multiple processors.

An exemplary embodiment of the present disclosure provides a method of processing an image by using image division including dividing an image frame into multiple subblocks having a predetermined pixel size, constituting multiple macroblocks by sampling respective pixels positioned at an identical position within a predetermined number of subblocks; and constituting multiple slices by dividing the multiple macroblocks based on the positions of the sampled pixels within the subblock.

The method may further include encoding the multiple slices in parallel by using multiple image encoding processors and generating a bit stream by combining encoded data.

Another exemplary embodiment of the present disclosure provides a method of processing an image by using image division, including: dividing an image frame into multiple subblocks having a predetermined pixel size; calculating an average value of pixels of each of the multiple subblocks; and constituting one average value slice with pixels having the average value.

The method may further include: constituting multiple macroblocks by sampling respective pixels positioned at an identical position within a predetermined number of subblocks; and constituting multiple slices by dividing the multiple macroblocks according to the positions of the sampled pixels within the subblock, the multiple slices being constituted of difference value by calculating a difference value between pixels included in each of the multiple slices and pixels included in the average value slice.

The method may further include: encoding the average value slice and the multiple slices constituted of the difference values in parallel by using multiple image encoding processors; and generating a bit stream by combining the encoded data.

In the encoding, information on positions of the pixels constituting each of the slices within the subblock may be recorded in a header of the slice.

Yet another exemplary embodiment of the present disclosure provides a device for processing an image by using image division, including: an image divider configured to divide an image frame into multiple subblocks having a predetermined pixel size, constitute multiple macroblocks by sampling respective pixels positioned at an identical position within a predetermined number of subblocks, and constitute multiple slices by dividing the multiple macroblocks according to positions of the sampled pixels within the subblock; a multi processor comprising multiple image encoding processors configured to encode the multiple slices in parallel; and a data combiner configured to generate a bit stream by combining the encoded data.

The image divider may calculate an average value of the pixels of each of the multiple subblocks to further constitute one average value slice with pixels having the average value, and may calculate a difference value between the pixels included in each of the multiple slices and pixels included in the average value slice to constitute the multiple slices with the difference values.

The multiple image encoding processors may encode the average value slice and the multiple slices constituted of the difference values in parallel.

According to exemplary embodiments of the present disclosure, an encoding and a decoding are processed by dividing an image so that adjacent pixels are included in different slices, respectively. Accordingly, even though an error is generated in a part of the slices in a process of data transmission, the deterioration of the image quality due to the error generation is dispersed to an entire image, so that it is possible to remarkably reduce the evident deterioration of the image quality through peripheral pixels transmitted without an error.

Compression efficiency is improved compared to a case in which the same number of slices is divided by the technology in the related art.

Even when only one among multiple slices is decoded, it is possible to obtain a reduced entire image, so that spatial scalability is further effectively provided.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 4:
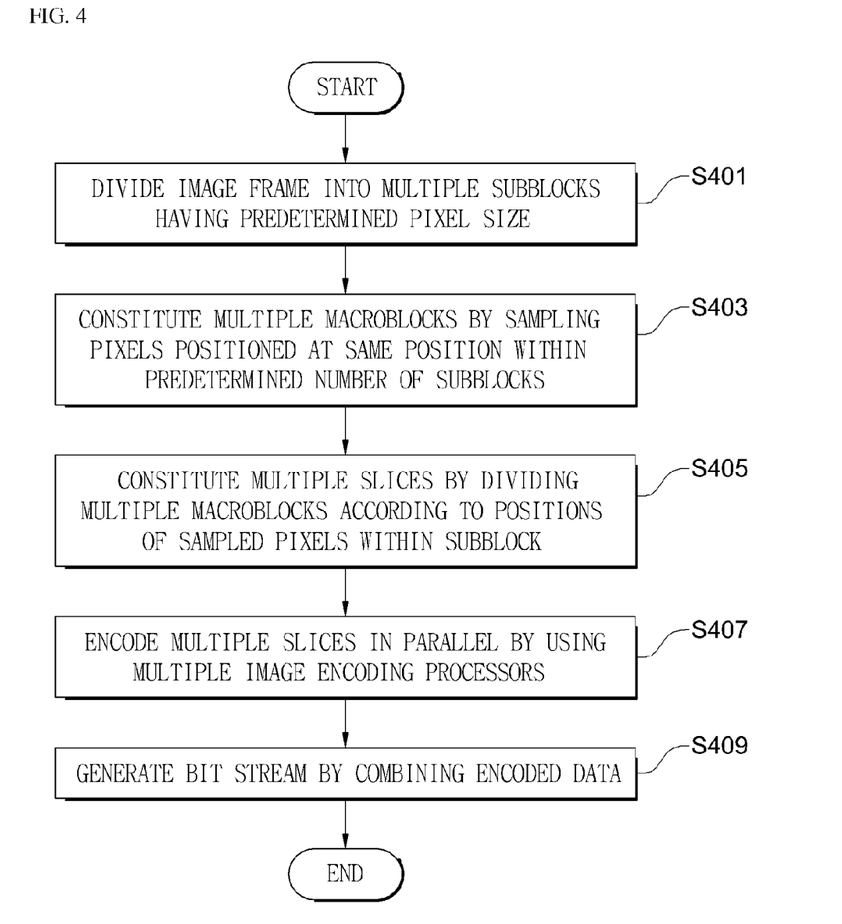
FIG. 4 is a flowchart illustrating a method of processing an image by using image division according to an exemplary embodiment of the present disclosure.
Figure 5:
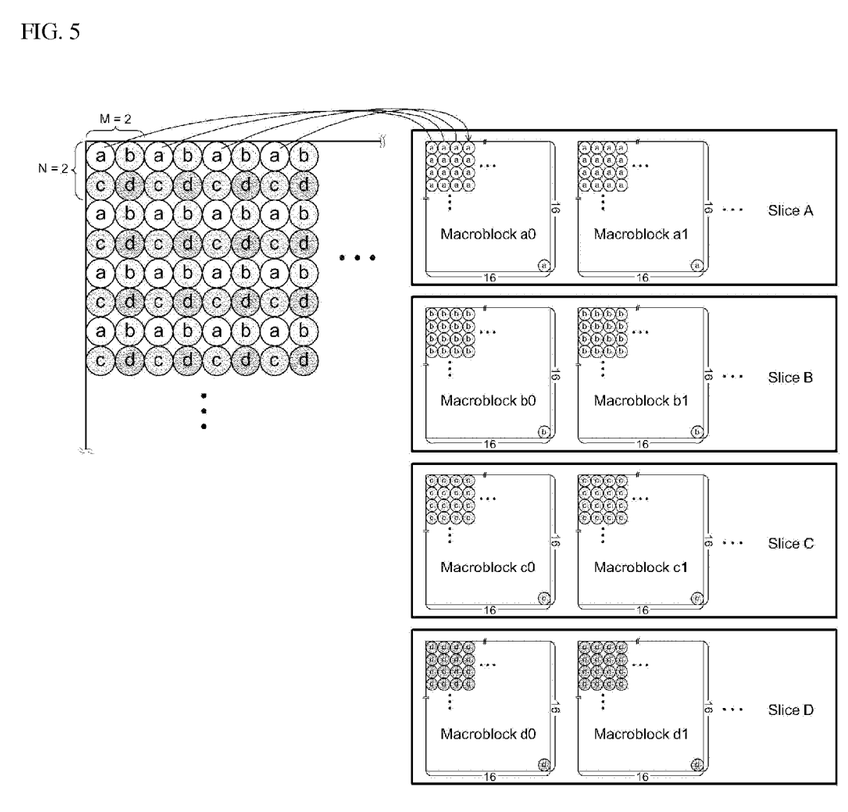
FIG. 5 is a diagram for describing a method of dividing an image according to the exemplary embodiment of FIG. 4 in detail.

FIG. 4 is a flowchart illustrating a method of processing an image by using image division according to an exemplary embodiment of the present disclosure, and FIG. 5 is a diagram for describing a method of dividing an image according to the exemplary embodiment of FIG. 4 in detail.

Referring to FIGS. 4 and 5, the method of processing an image by using image division according to an exemplary embodiment of the present disclosure includes dividing an image frame into multiple subblocks having a predetermined pixel size (S401), constituting multiple macroblocks by sampling respective pixels positioned at an identical position within a predetermined number of subblocks (S403); and constituting multiple slices by dividing the multiple macroblocks based on the positions of the sampled pixels within the subblock (S405). The method of processing the image by using image division according to another exemplary embodiment of the present disclosure may further include encoding the average value slice and the multiple slices constituted of the difference values in parallel by using multiple image encoding processors (S407) and generating a bit stream by combining encoded data (S409).

In the present exemplary embodiment, it is assumed that one macro block has a 16×16 pixel size. However, it is apparent that a size of the macroblock may vary according to a format, resolution and the like of the image.

In step S401, the original image is divided so that M×N pixels of the original image constitute one subblock. In the present exemplary embodiment, M=N=2, and as illustrated in FIG. 5, positions of four adjacent pixels within the one subblock are represented by a, b, c and d.

In step S403, the multiple macroblocks are constituted by sampling the pixels positioned at the same position within 16×16 subblocks. That is, when a sampling is performed in a horizontal direction by M:1 and in a vertical direction by N:1, pixels are alternately selected one by one in the horizontal and vertical directions under the condition of M=N=2, so that the respective pixels positioned at the adjacent positions a, b, c and d within the respective subblocks are divided to constitute the different macroblocks. Through the method, the pixels positioned at the position a are collected to constitute macroblocks a0, a1, ..., and similarly, the pixels positioned at the positions, b, c and d are collected to constitute macroblocks b0, b1, ..., c0, c1, ..., and d0, d1, ....

In step S405, the slice consists of the multiple macroblocks including the pixels positioned at the same position. That is, slice A is constituted by collecting the macroblocks a0, a1, ..., and slices B, C and D are constituted in the same manner, respectively.

Next, in step S407, the slices A, B, C and D are simultaneously encoded in parallel by using the multiple image encoding processors, and in step S409, the encoded data is combined to generate one bit stream. The respective slices may be combined and transmitted without being limited by the order.

In this case, in order to achieve the accurate decoding of the bit stream, information on the positions of the pixels included in the respective slices within the subblock may be recorded in a header of the slice in the process of the encoding. Otherwise, necessary information may be removed from the header of the slice by pre-defining values of M and N and also pre-defining a transmission order of the slices. In a subsequent decoding process, decoding results of the respective slices may be re-combined by using the recorded information or the pre-defined order so that the pixels included in the respective slices may be displayed at proper positions on the image.

In the meantime, according to the present disclosure, spatial scalability may be effectively supported in one bit stream. That is, according to the exemplary embodiment, since the respective slices equally have the spatial information on the image, even if any one among the slices A, B, C and D is decoded, it is possible to obtain a reduced entire image.

Figure 6:
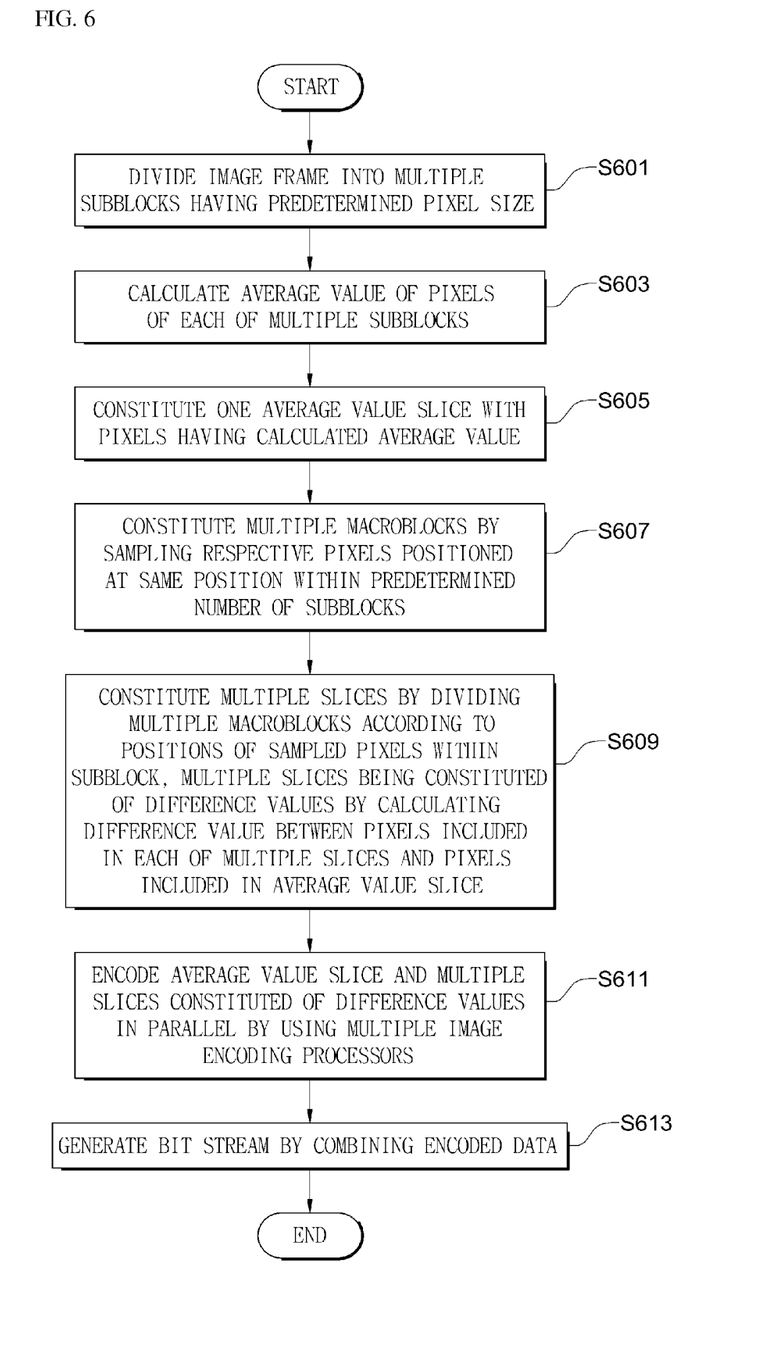
FIG. 6 is a flowchart illustrating a method of processing an image by using image division according to another exemplary embodiment of the present disclosure.

FIG. 6 is a flowchart illustrating a method of processing an image by using image division according to another exemplary embodiment of the present disclosure.

Referring to FIG. 6, a method of processing an image according to another exemplary embodiment of the present disclosure includes dividing an image frame into multiple subblocks having a predetermined pixel size (S601), calculating an average value of pixels of each of the multiple subblocks (S603), constituting one average value slice with the pixels having the calculated average value (S605), constituting multiple macroblocks by sampling respective pixels positioned at the same position within the predetermined number of subblocks (S607), and constituting multiple slices by dividing the multiple macroblocks according to the positions of the sampled pixels within the subblock, the multiple slices being constituted of difference values by calculating a difference value between the pixels included in each of the multiple slices and the pixels included in the average value slice (S609). The method of processing the image by using image division may further include encoding the average value slice and the multiple slices constituted of difference values in parallel by using multiple image encoding processors (S611) and generating a bit stream by combining encoded data (S613).

In the present exemplary embodiment, as an applied example in which spatial scalability is further evolved from the exemplary embodiment of FIGS. 4 and 5, a separate average value slice constituted of pixels having an average value of the pixels included in each of the subblocks illustrated in FIG. 5 may be generated, and the remaining slices may be constituted of the difference values from the pixels included in the average value slice in order to improve encoding efficiency. In this case, in a decoding process, a restored image with a small size may be obtained by decoding only the average value slice, and when the remaining slices are additionally decoded, the image having the same size as that of the original image may be obtained.

Figure 7:
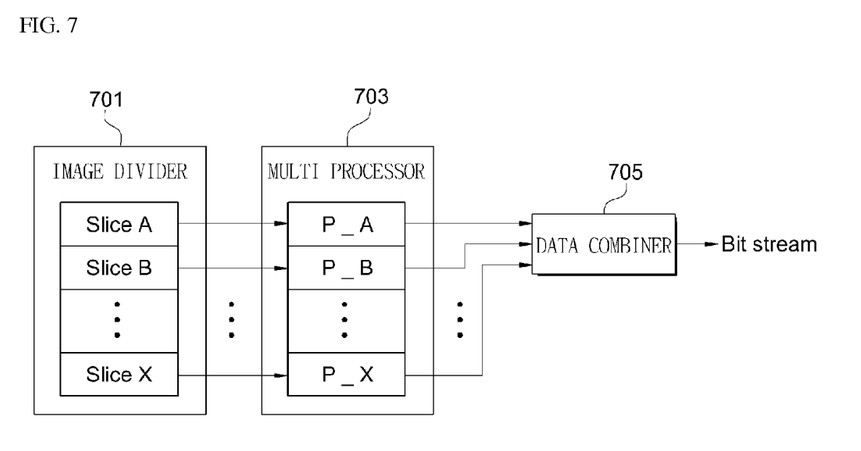
FIG. 7 is a configuration diagram illustrating a device for processing an image by using image division according to an exemplary embodiment of the present disclosure.

FIG. 7 is a configuration diagram illustrating a device for processing an image by using image division according to an exemplary embodiment of the present disclosure.

Referring to FIG. 7, a device for processing an image by using image division according to an exemplary embodiment of the present disclosure includes an image divider 701, a multi processor 703 and a data combiner 705.

The image divider 701 may divide an image frame into multiple subblocks having a predetermined pixel size, constitute multiple macroblocks by sampling respective pixels positioned at an identical position within a predetermined number of subblocks, and constitute multiple slices by dividing the multiple macroblocks according to positions of the sampled pixels within the subblock.

The image divider 701 may calculate an average value of the pixels of each of the multiple subblocks and further constitute one average value slice with pixels having the calculated average value. In this case, the image divider 701 may also constitute the multiple slices with calculated difference values by calculating a difference value between the pixels included in each of the multiple slices and the pixels included in the average value slice.

The multi processor 703 includes multiple image encoding processors P_A, P_B, . . . and P_X in order to simultaneously encode the multiple slices in parallel. The multiple image encoding processors P_A, P_B, . . . and P_X may record information on positions of the pixels constituting each of the slices within the subblock in a header of the slice in the encoding. The multi processor 703 includes multiples cores in one chip, so that the multi processor 703 may be implemented in a form like a multicore processor which performs different calculations in parallel.

The data combiner 705 generates one bit stream by combining data that is encoded in parallel. A combination order of the parallel data may be determined in a defined order according to a standard or the like of an image or may be arbitrarily determined.

More detailed functions of the respective elements and effects thereof are the same as those described with reference to FIGS. 4 to 6.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of processing an image by using image division, comprising:
    dividing an image frame into multiple subblocks having a predetermined pixel size;
    constituting multiple macroblocks by sampling respective pixels corresponding to an identical position, differing from each of others of adjacent positions, within respective subblocks of the multiple subblocks; and
    constituting multiple slices by classifying the multiple macroblocks based on a criterion of the identical position, differing from the others of the adjacent positions, within respective subblocks of the multiple subblocks.

2. The method of claim 1, further comprising:
    encoding the multiple slices in parallel by using multiple image encoding processors; and
    generating a bit stream by combining the encoded data.

3. The method of claim 2, wherein in the encoding, information on positions of the pixels constituting each of the slices within the subblock is recorded in a header of the slice.

4. The method of claim 1, wherein the macroblock has a 16×16 pixel size.

* * * * *